United States Patent
Son et al.

(10) Patent No.: US 9,001,184 B2
(45) Date of Patent: Apr. 7, 2015

(54) APPARATUS AND METHOD FOR TAKING IMAGE AND CONDUCTING VIDEO COMMUNICATION

(75) Inventors: Tae-Hwan Son, Suwon-si (KR); Jin-He Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 13/567,409

(22) Filed: Aug. 6, 2012

(65) Prior Publication Data

US 2013/0182062 A1 Jul. 18, 2013

(30) Foreign Application Priority Data

Jan. 12, 2012 (KR) .......................... 10-2012-0003726

(51) Int. Cl.
*H04N 7/14* (2006.01)

(52) U.S. Cl.
CPC ....................................... *H04N 7/14* (2013.01)

(58) Field of Classification Search
CPC ......... H04N 7/14; H04N 7/141; H04N 7/142; H04N 7/144; H04N 7/15
USPC .............................................. 348/14.1–14.16
See application file for complete search history.

(56) References Cited

U.S. PATENT DOCUMENTS

| | | | | |
|---|---|---|---|---|
| 2009/0015703 A1* | 1/2009 | Kim et al. | ................ | 348/333.12 |
| 2009/0278913 A1* | 11/2009 | Rosenfeld et al. | ......... | 348/14.16 |
| 2009/0295943 A1 | 12/2009 | Kim et al. | | |
| 2010/0045772 A1* | 2/2010 | Roo et al. | ................... | 348/14.01 |
| 2011/0102538 A1* | 5/2011 | Tan | ............................. | 348/14.08 |
| 2012/0257004 A1* | 10/2012 | Smith et al. | ................ | 348/14.16 |
| 2013/0027504 A1* | 1/2013 | Zhang | ........................ | 348/14.08 |

FOREIGN PATENT DOCUMENTS

KR 10-2009-0126141 A 12/2009

\* cited by examiner

*Primary Examiner* — Melur Ramakrishnaiah
(74) *Attorney, Agent, or Firm* — Jefferson IP Law, LLP (57) ABSTRACT

A method and an apparatus for taking an image and conducting video communication are provided. The image-taking and video communication apparatus includes a transparent display, a front camera, and a controller. The front camera is positioned behind the transparent display and captures an image of an object in front of the transparent display through the transparent display. The controller synchronizes an image capture period of the front camera with a screen output period of the transparent display so that image capturing of the front camera alternates with screen output of the transparent display.

12 Claims, 7 Drawing Sheets

APPARATUS AND METHOD FOR TAKING IMAGE AND CONDUCTING VIDEO COMMUNICATION

PRIORITY

This application claims priority under 35 U.S.C. §119(a) to a Korean patent application filed in the Korean Intellectual Property Office on Jan. 12, 2012 and assigned Serial No. 10-2012-0003726, the entire disclosure of which is hereby incorporated by reference.

BACKGROUND OF THE INVENTION

1. Field of the Invention

The present invention relates to a method and an apparatus equipped with a front camera. More particularly, the present invention relates to a method and an apparatus for capturing an image of an object by means of a front camera and for taking the captured image or for using the captured image for video communication.

2. Description of the Related Art

In general, a mobile terminal such as a mobile phone, a tablet computer, a smart phone, or the like is equipped with a camera. Many types of recently popular mobile terminals have a front camera as well as a rear camera. For purposes of clarity, in the specification, the term 'front camera' corresponds to a camera installed on the frontal surface of the body of a mobile terminal, on which a display is mounted, and the term 'rear camera' corresponds to a camera installed on the rear surface of the body of the mobile terminal. The front camera is typically disposed above the display on the frontal surface of the body of the mobile terminal. For example, a mobile terminal having a touch screen panel on the frontal surface of its body is equipped with a front camera at an upper left-hand or upper right-hand portion of the display.

The front camera is generally used for a self-camera function or a video communication function. Herein, a 'self-camera' function or 'self-camera' mode refers to a function or mode that allows a mobile terminal user to take (e.g., capture) his or her own image. A 'video communication' function or 'video communication' mode refers to a function or mode in which an image of a mobile terminal user is captured by a mobile terminal and transmitted to a terminal (e.g., a mobile terminal) of the other party and in which an image of the other party is received and displayed on a display for the mobile terminal user, during video communication with the other party.

The mobile terminal user views his or her own image displayed on the display while taking a picture of himself or herself During video communication, the mobile terminal user views at least one of an image of himself or herself and an image of the other party on the display. Because the front camera is positioned offset from the display, the mobile terminal user directs his or her glance not to the front camera but to the display in the image of the mobile terminal user taken by the front camera. Therefore, the mobile terminal user does not look straight ahead in the image of the mobile terminal user captured by the front camera. Herein, the mobile terminal user's glance depends on the position and distance of the front camera relative to the display and the rotational direction of the display. For example, if a mobile terminal having a front camera at an upper portion of its body is set to display an image vertically and a mobile terminal user looks at a display, the mobile terminal user's glance is directed downward in an image of the user captured by the front camera. Moreover, the mobile terminal user's glance is highly likely to be off-center in the captured image.

However, it is difficult for the mobile terminal user to adjust the position and direction of the mobile terminal in order to display the mobile terminal user's face at an intended position on the display. In particular, the mobile terminal user has difficulty in centering an image of the mobile terminal user captured by the front camera on the screen.

Accordingly, the mobile terminal user continuously moves his or her glance to monitor his or her image displayed on the display as well as to check the direction of the camera.

During video communication, it is difficult for the mobile terminal user to appear looking straight ahead due to the distance between the front camera and a screen displaying the mobile terminal user and a screen displaying the other party in a video communication screen. As a result, the mobile terminal user may not feel as if he or she were talking with the other party face to face because the other party does not look straight ahead in an image displayed on the display during the video communication.

When an image captured by the front camera is taken, the mobile terminal user's glance should be directed to the front camera to appear to look ahead in the captured image. Thus, the mobile terminal user cannot monitor his or her glance or expression at the moment an image of the mobile terminal user captured by the front camera is taken. Accordingly, the mobile terminal user may not monitor an image of himself or herself to be transmitted to the other party during video communication.

Therefore, a need exists for a system, method and apparatus for capturing an image of an object by means of a front camera such that when an image is captured by the front camera, the mobile user's glance is directed to the front camera so as to appear that the mobile user is looking ahead in the captured image. A system, method and apparatus is needed which enables the mobile terminal user to monitor his or her glance or expression at the moment an image of the mobile terminal user is captured while the user's glance appears to be directed to the front camera.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of embodiments of the present invention are to address at least the above-mentioned problems and/or disadvantages and to provide at least the advantages described below. Accordingly, an aspect of embodiments of the present invention is to provide an apparatus and method for taking an image and conducting video communication using a front camera so that a user can monitor a captured image of himself or herself.

Another aspect of embodiments of the present invention is to provide an apparatus and method for taking an image and conducting video communication using a front camera so that a user can readily monitor a captured image of himself or herself to be transmitted to the other party during video communication.

A further aspect of embodiments of the present invention is to provide an apparatus and method for taking an image and conducting video communication using a front camera, which can improve a feeling of liveliness during video communication using a front camera.

In accordance with an aspect of the present invention, an image taking apparatus is provided. The image taking apparatus includes a transparent display, a front camera, and a controller. The front camera is positioned behind the transparent display and captures an image of an object in front of the transparent display through the transparent display. The controller synchronizes an image capture period of the front camera with a screen output period of the transparent display so that image capturing of the front camera alternates with screen output of the transparent display.

In accordance with another aspect of the present invention, a video communication apparatus is provided. The video communication apparatus includes a transparent display, a front camera, and a controller. The front camera is positioned behind the transparent display and captures an image of an object in front of the transparent display through the transparent display. The controller synchronizes an image capture period of the front camera with a screen output period of the transparent display so that image capturing of the front camera alternates with screen output of the transparent display. During video communication, the controller outputs an image captured by the front camera to a user preview screen on the transparent display, transmits the image captured by the front camera to the other party, and upon receipt of an image of the other party, outputs the image of the other party in a preview screen associated with the other party on the transparent display.

In accordance with another aspect of the present invention, a video communication apparatus is provided. The video communication apparatus includes a display and a controller. Upon receipt of an image of another party during video communication, the controller shifts the image of the other party so that the middle of the other party's two eyes in the other party's face in the image of the other party is centered on a screen of the display and outputs the shifted image of the other party in a preview screen associated with the other party on the display.

In accordance with another aspect of the present invention, a method for taking an image in an apparatus is provided. The method includes a front camera positioned on a rear surface of a transparent display, for capturing an image of an object in front of the transparent display through the transparent display, in which an image capture period of the front camera is synchronized with a screen output period of the transparent display so that image capturing of the front camera alternates with screen output of the transparent display, and the image captured by the front camera is output in a preview screen on the transparent display.

In accordance with another aspect of the present invention, a method for conducting video communication in an apparatus is provided. The method includes a front camera positioned behind a transparent display, for capturing an image of an object in front of the transparent display through the transparent display, in which when a video communication mode is set, an image capture period of the front camera is synchronized with a screen output period of the transparent display so that image capturing of the front camera alternates with screen output of the transparent display, an image captured by the front camera is output in a user preview screen on the transparent display and transmitted to another party of video communication, and an image of the other party is received and output in a preview screen associated with the other party on the transparent display.

In accordance with another aspect of the present invention, a method for conducting video communication is provided. The method includes receiving an image of another party during video communication, shifting the received image so that the middle of the other party's two eyes in the other party's face in the image of the other party is centered on a screen of a display, and outputting the shifted image on the screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 8A to 9C illustrate exemplary images in a video communication mode according to an exemplary embodiment of the present invention.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While embodiments of the present invention are described in the context of a mobile terminal, it is purely exemplary. Thus it is to be understood that the embodiments of the present invention are also applicable to other devices having a similar technological background. In addition, those skilled in the art can implement the embodiments of the present invention for other devices through modifications within the scope and spirit of the present invention. That is, as far as a device is capable of performing at least one of a self-camera function and a video communication function, the embodiments of the present invention are applicable to the device even though the device is not a mobile terminal. For example, the present invention can be implemented in a desktop computer or any other type of PC which has an independent camera in the vicinity of a monitor or is connected to a camera installed on the frontal surface of the monitor. As another example, the present invention can be implemented in a TV which is connected to the internet (e.g., a Smart TV). If a digital camera has the self-camera function, the present invention is also applicable to the digital camera.

The term used herein 'mobile terminal' covers a broad range of terminals having at least one of the self-camera function and the video communication function, including a communication terminal, a portable computer, a multimedia device, and a portable phone.

Figure 1:
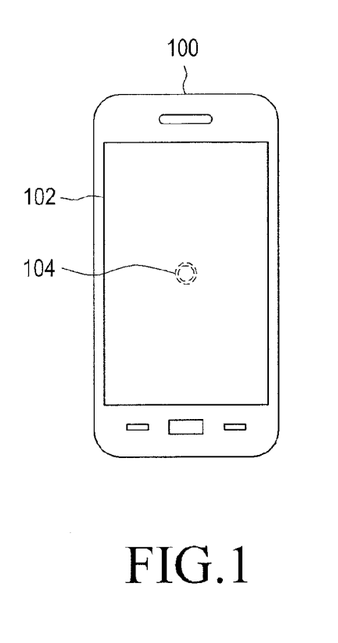
FIG. 1 is a frontal view of a mobile terminal equipped with a front camera according to an exemplary embodiment of the present invention.
Figure 2:
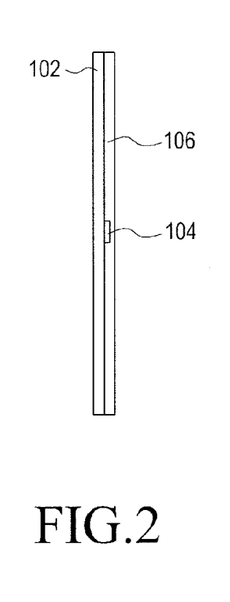
FIG. 2 is a side sectional view of a mobile terminal such as, for example, the mobile terminal illustrated in FIG. 1, referred to for describing the disposition of the front camera according to an exemplary embodiment of the present invention.

FIG. 1 is a frontal view of a mobile terminal equipped with a front camera according to an exemplary embodiment of the present invention, and FIG. 2 is a side sectional view of a mobile terminal such as, for example the mobile terminal illustrated in FIG. 1 according to an exemplary embodiment of the present invention, referred to for describing the disposition of the front camera according to an exemplary embodiment of the present invention.

Referring to FIGS. 1 and 2, a front camera 104 is positioned on the rear surface of a display 102 in a mobile terminal 100. The display 102 is a transparent display, for example, a Transparent Organic Light Emitting Diode (TOLED) display. To indicate the disposition of the front camera 104 on the rear surface of the transparent display 102, the front camera 104 is marked with a dotted line in FIG. 1. According to exemplary embodiments of the present invention, although the front camera 104 resides on the rear surface of the transparent display 102, the front camera 104 can capture an image of an object in front of the transparent display 102 through the transparent display 102 due to the transparency of the display 102. Owing to the disposition of the front camera 104 on the rear surface of the transparent display 102, the front camera 104 is located within the screen range of the transparent display 102, not beyond the screen range of the transparent display 102.

In FIGS. 1 and 2, the front camera 104 is shown as positioned at the center of the rear surface of the transparent display 102, to which the present invention is not limited. Thus the front camera 104 may be mounted at any position on the rear surface of the display 102. However, considering a user's glance is naturally directed toward the center of the screen when the user views the screen of the transparent display 102, it is preferred to dispose the front camera 104 at the center of the rear surface of the transparent display 102 as illustrated in FIGS. 1 and 2.

Referring to FIG. 2, according to exemplary embodiments of the present invention, the transparent display 102 is preferably brought into close contact with a body device 106 having the front camera 104 installed therein, without a gap in order to block introduction of unnecessary light on the front camera 104. Accordingly, it is preferred that at least a part around the front camera 104 on the rear surface of the transparent display 102 closely contacts the body device 106.

Figure 3:
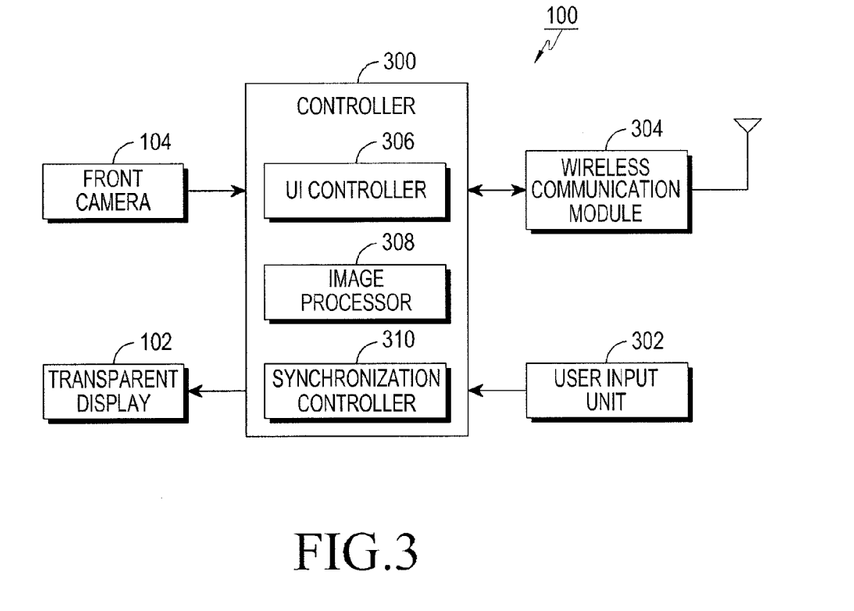
FIG. 3 is a block diagram of a mobile terminal according to an exemplary embodiment of the present invention.

FIG. 3 is a block diagram of the mobile terminal 100 according to an exemplary embodiment of the present invention.

Figure 10A:
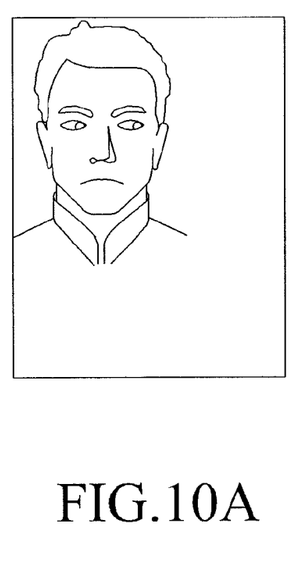
FIGS. 10A and 10B illustrate exemplary correction of an image of another party according to an exemplary embodiment of the present invention.
Figure 10B:
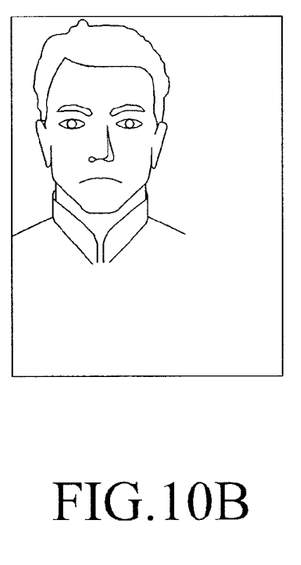

Referring to FIG. 3, the mobile terminal 100 includes a transparent display 102, a front camera 104, a controller 300, a user input unit 302, and a wireless communication module 304. Exemplary embodiments of the present invention may include the transparent display 102 and the front camera 104 which have been described above with reference to FIGS. 1 and 2. The controller 300 may perform typical functions of the mobile terminal 100 and includes a User Interface (UI) controller 306, an image processor 308, and a synchronization controller 310 to carry out operations illustrated in FIGS. 5 and 7. The UI controller 306 provides a UI for user input and user output through the transparent display 102, the front camera 104, and the user input unit 302 in a self-camera mode and a video communication mode according to exemplary embodiments of the present invention. The image processor 308 corrects an image received from the other party during video communication as illustrated in FIGS. 10A and 10B, which will be described later. The synchronization controller 310 synchronizes an image capture period of the front camera 104 with a screen output period of the transparent display 102 as illustrated in FIGS. 4A and 4B.

Figure 4A:
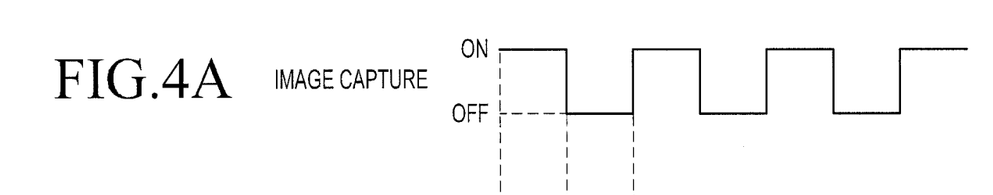
FIGS. 4A and 4B are diagrams illustrating operation timings of a mobile terminal such as, for example, the mobile terminal illustrated in FIG. 3 according to an exemplary embodiment of the present invention.
Figure 4B:
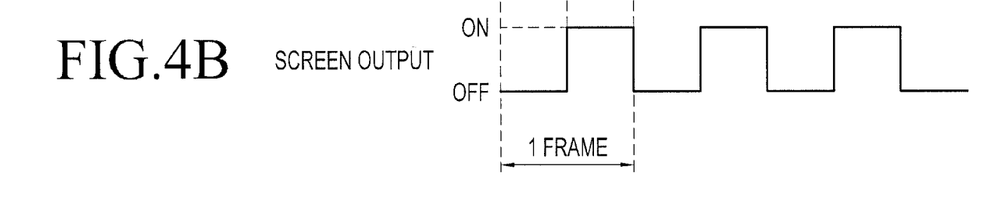

FIGS. 4A and 4B are diagrams illustrating operation timings of a mobile terminal such as, for example, the mobile terminal illustrated in FIG. 3 according to an exemplary embodiment of the present invention. Specifically, FIG. 4A is an image capture timing diagram of the front camera 104 and FIG. 4B is an image output timing diagram of the transparent display 102.

Referring to FIGS. 4A and 4B, according to exemplary embodiments of the present invention, the synchronization controller 310 synchronizes the image capture period of the front camera 104 with the screen output period of the transparent display 102 by controlling the front camera 104 and the transparent display 102 in such a manner that image capturing of the front camera 104 alternates with screen output of the transparent display 102, as illustrated in FIGS. 4A and 4B. In FIGS. 4A and 4B, image capturing of the front camera 104 and screen output of the transparent display 102 are alternately switched on and off That is, the front camera 104 captures an image while the transparent display 102 does not output a screen and the transparent display 102 outputs a screen while the front camera 104 does not capture an image, in each video frame. Therefore, the front camera 104 may capture an image of an object in front of the transparent display 102 without interference from an image displayed on the transparent display 102. For example, in the illustrated case of FIGS. 4A and 4B, on/off of image capturing of the front camera 104 is synchronized with off/on of screen output of the transparent display 102 on a one-frame basis. According to other exemplary embodiments of the present invention, the synchronization may take place on a two- or more-frame basis.

Referring to FIG. 3 again, the user input unit 302 provides user inputs to the controller 300. For this purpose, the user input unit 302 may include buttons and/or a keypad. The user input unit 302 may include a touch panel which is an input device mounted on the transparent display 102. The wireless communication module 304 takes charge of wireless communication for voice communication, video communication, and data communication performed by the controller 300 in the mobile terminal 100. The wireless communication of the wireless communication module 304 may be mobile communication or short-range communication.

Figure 5:
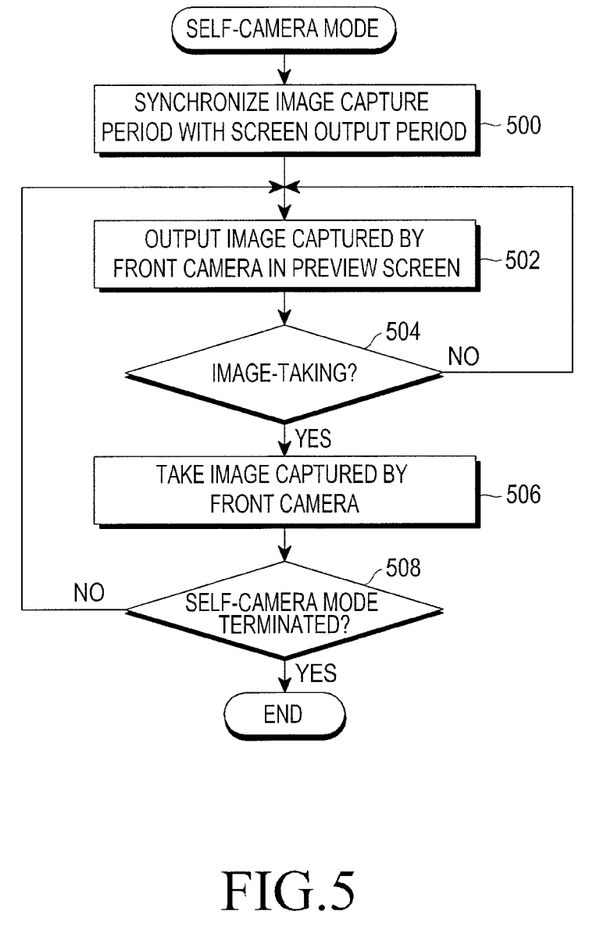
FIG. 5 is a flowchart illustrating a self-camera mode operation according to an exemplary embodiment of the present invention.

FIG. 5 is a flowchart illustrating a self-camera mode operation according to an exemplary embodiment of the present invention. With reference to FIG. 5, a self-camera mode operation of a controller 300 according to an exemplary embodiment of the present invention will be described.

Referring to FIG. 5, when the self-camera mode is set by a user input received through the user input unit 302, the controller 300 synchronizes the image capture period of the front camera 104 with the screen output period of the transparent display 102 through the synchronization controller 310 in the manner described before with reference to FIGS. 4A and 4B in step 500.

In step 502, the controller 300 outputs the image captured by the front camera 104 in a preview screen on the transparent display 102 and in step 504 the controller 300 determines whether an input is received to take an image (e.g., determines whether an image-taking request is received from the user while the preview screen is being output). Because the front camera 104 is positioned on the rear surface of the transparent display 102, the user may look at the preview screen to monitor his or her appearance and thus the user is shown as looking straight ahead in the displayed preview screen. In this manner, when the user takes a self-picture using the front camera 104, the user may naturally monitor an actual image of the user and easily adjust the position and direction of the mobile terminal 100 so that the user's face is positioned within the preview screen on the transparent display 102.

According to exemplary embodiments of the present invention, the controller 300 may move the user's image to a position matching to the front camera 104 and display the user's image centered on the front camera 104 in the preview screen on the transparent display 102.

Figure 6A:
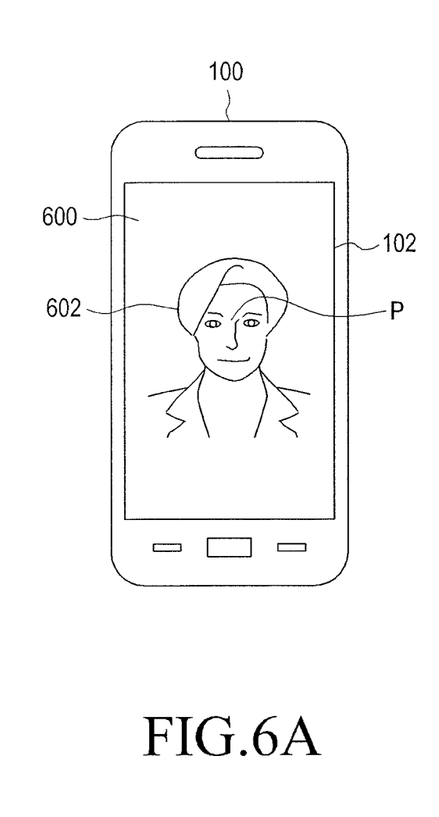
FIGS. 6A and 6B illustrate exemplary images of a user in a self-camera mode according to an exemplary embodiment of the present invention.
Figure 6B:
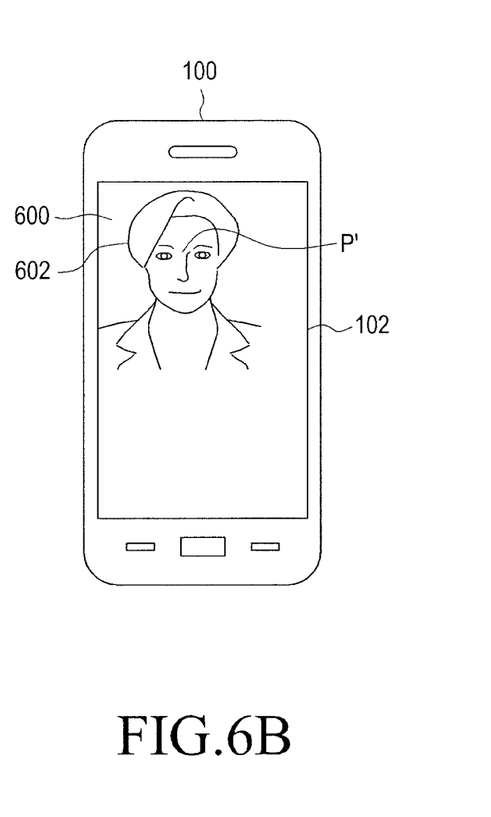

FIGS. 6A and 6B illustrate exemplary images of a user in a self-camera mode according to an exemplary embodiment of the present.

In particular, FIGS. 6A and 6B illustrate examples of displaying a user's image centered on the position of the front camera 104. For example, FIG. 6A illustrates a user image 602 displayed at the center of a screen 600 according to an exemplary embodiment of the present invention, when the position P of the front camera 104 corresponds to the center of the screen 600 on the transparent display 102. As another example, FIG. 6B illustrates a user image 602 shifted to an upper left-hand position of the screen 600 according to an exemplary embodiment of the present invention, when the position P' of the front camera 104 corresponds to the upper left-hand position of the screen 600 on the transparent display 102.

Referring back to FIG. 5, upon receipt of an image-taking request from the user while the preview screen is being output as described above in step 504, the controller 300 takes the image captured by the front camera 104 in step 506. Later, upon receipt of a request for self-camera mode termination from the user through the user input unit 302, the controller 300 ends the self-camera mode in step 508. Otherwise, the controller 300 performs steps 502 to 506.

Figure 7:
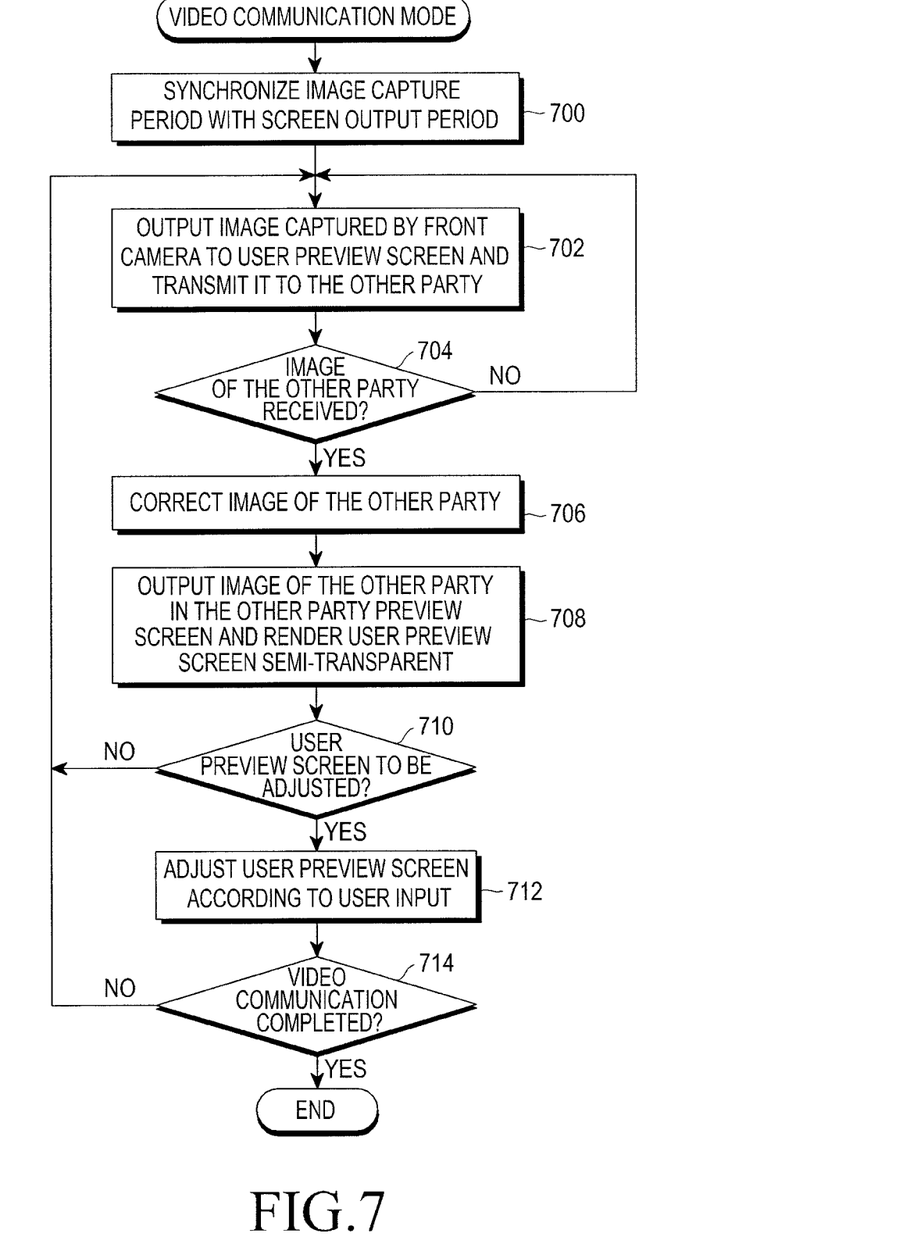
FIG. 7 is a flowchart illustrating a video communication mode operation according to an exemplary embodiment of the present invention.

FIG. 7 is a flowchart illustrating a video communication mode operation of the controller 300 according to an exemplary embodiment of the present invention.

According to an exemplary embodiment of the present invention, an image of the user to be transmitted to the other party as well as an image of the other party may be displayed on the display screen of the mobile terminal during video communication. As an example, a video communication screen triggered by a video communication function may include a user preview screen and the other party preview screen. Herein, the 'user preview screen' refers to a screen that displays an image of a mobile terminal user captured by a camera and the 'other party preview screen' refers to a screen that displays an image received from the other party of video communication.

Referring to FIG. 7, when the video communication mode is set by a user input received through the user input unit 302, the controller 300 synchronizes the image capture period of the front camera 104 with the screen output period of the transparent display 102 through the synchronization controller 310 in the manner described before with reference to FIGS. 4A and 4B in step 700.

In step 702, the controller 300 outputs an image captured by the front camera 104 in a user preview screen set on the screen of the transparent display 102 and transmits the captured image to the other party. User preview screens according to exemplary embodiments of the present invention are illustrated in FIGS. 8A to 9C.

Figure 8A:
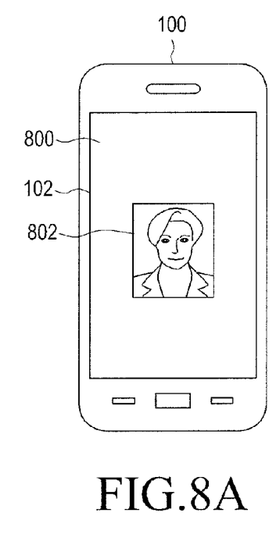
Figure 8B:
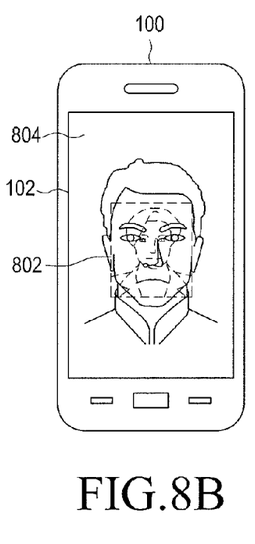
Figure 8C:
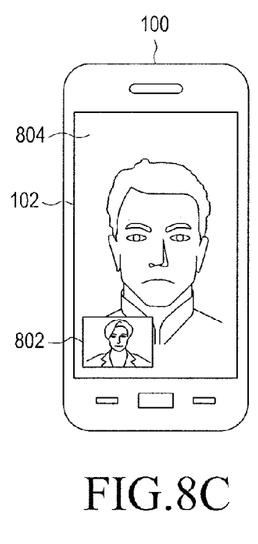
Figure 9A:
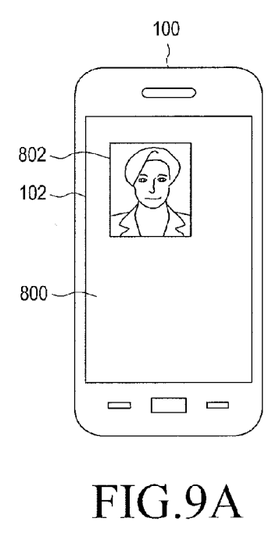
Figure 9B:
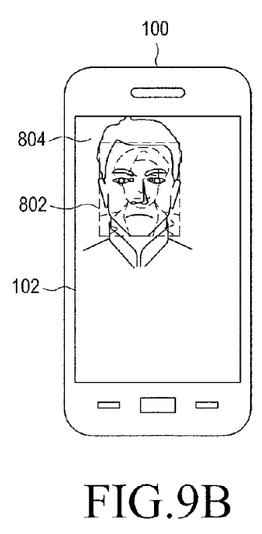
Figure 9C:
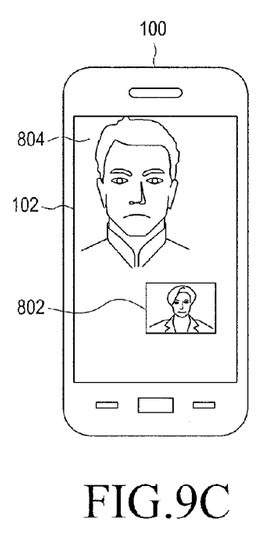

FIGS. 8A to 8C illustrate exemplary images in a video communication mode according to an exemplary embodiment of the present invention. For example, FIGS. 8A to 8C illustrate an example of displaying a user preview screen 802 and the other party preview screen 804 according to an exemplary embodiment of the present invention, when the front camera 104 is positioned at the center of a screen 800 of the display 102, and FIGS. 9A to 9C illustrate an example of displaying the user preview screen 802 and the other party preview screen 804 according to an exemplary embodiment of the present invention, when the front camera 104 is positioned at an upper left-hand portion of the screen 800 of the display 102. As illustrated in FIGS. 8A and 9A, the user preview screen 802 is displayed smaller than the entire screen 800 of the transparent display 102, centered on the position of the front camera 104.

Therefore, according to an exemplary embodiment of the present invention, when the user looks at the user preview screen 802 to monitor the user's image, the user is shown as looking straight ahead in the user preview screen 802. In this manner, the user can naturally monitor the user's appearance to be transmitted to the other party and easily adjust the position and direction of the mobile terminal 100 so that the user's face is positioned within the screen of the transparent display 102, particularly within the user preview screen 802. The controller 300 transmits an image captured by the front camera 104 to the other party. Hence, the other party participating in the video communication can conduct video communication, viewing the user's image in which the user looks straight ahead.

Referring back to FIG. 7, at step 704, the controller determines whether an image from the other party is received. Upon receipt of an image from the other party while the user preview screen 802 is being output as described above in step 704, the controller 300 corrects the other party's image through the image processor 308 in step 706.

FIGS. 10A and 10B illustrate exemplary correction of an image of another party according to an exemplary embodiment of the present invention.

Referring to FIGS. 10A and 10B, correction of the other party's image is illustrated. For example, FIGS. 10A and 10B illustrate an example of correcting an image in which the other party's face is off-center according to an exemplary embodiment of the present invention, positioned at an upper left-hand side and the other party's glance is directed downward to the right, not toward the center as illustrated in FIG. 10A to an image illustrated in FIG. 10B. According to an exemplary embodiment of the present invention, the controller 300 detects a facial area in the other party's image, detects eyes in the detected facial area, and analyzes the positions of the other party's pupils in the eyes. If the pupils are not centered in the eyes as illustrated in FIG. 10A, the controller 300 corrects the other party's image so as to correspond to the image illustrated in FIG. 10B in which the pupils are centered in the eyes. Detection of a facial area in an image including a face, detection of eyes, pupils, etc. in the facial area, or image correction can be carried out by general image processing techniques, which will not be described in detail herein.

Referring back to FIG. 7, subsequent to the controller correcting the image of the other party, in step 708, the controller 300 outputs the other party's image in the other party preview screen 804, while rendering the user preview screen 802 semi-transparent on the transparent display 102 as illustrated in FIGS. 8B and 9B. To indicate the semi-transparent state of the user preview screen 802, the user preview screen 802 is marked with a dotted line in FIGS. 8B and 9B. FIGS. 8B and 9B illustrate examples of displaying the other party preview screen 804 in full screen on the screen 800 of the transparent display 102. As the user preview screen 802 is overlapped with the other party preview screen 804, the user preview screen 802 is rendered semi-transparent to facilitate discrimination between the user preview screen 802 and the other party preview screen 804. For example, the controller 300 shifts the other party's image corrected as illustrated in FIG. 10B in the other party preview screen 804 so that the middle of the two eyes is centered on the front camera as illustrated in FIGS. 8B and 9B. As a result, the middle of the eyes in the other party's image corresponds to the position of the front camera 104 on the screen 800 of the transparent display 102. If the contour of the other party's face gets outside the other party preview screen 804 after shifting the other party's image, the controller 300 scales down the other party's image as illustrated in FIG. 9B so that the overall contour of the other party's image falls within the other party preview screen 804.

As the other party's face is corrected in the other party's image and the corrected other party's image is shifted to be centered on the position of the front camera 104 as illustrated in FIGS. 8B and 9B, the user may conduct video communication, viewing the other party's image in which the other party is looking straight ahead, even though the front camera 104 is not mounted on the rear surface of the transparent display 104 in a mobile terminal of the other party, unlike the mobile terminal according to the embodiment of the present invention.

Therefore, according to exemplary embodiments of the present invention, each of those participating in video communication can view an image in which the other party is looking straight ahead, making eye contact during the video communication. As a consequence, those participating in video communication can conduct the video communication as if the participants were talking face to face, thereby increasing a feeling of liveliness.

If the user wants to continue the video communication, monitoring the user's own image, the user will maintain the current user preview screen 802. On the other hand, if the user determines that he or she has monitored his or her own image enough, the user may change the position and size of the user preview screen 802 as illustrated in FIGS. 8C and 9C. Herein, the user may shift the user preview screen 802 or adjust the size of the user preview screen 802 through the user input unit 302. For example, if the user input unit 302 includes a touch panel, the user may shift the user preview screen 802 through a touch interface or adjust the size of the user preview screen 802 through a multi-touch interface. The controller 300 controls the user preview screen 802 according to a user input for adjusting the user preview screen, received through the user input unit 302 in steps 710 to 712. At step 710, the controller 300 determines whether the user wants to adjust the user preview screen 802. If the controller 300 determines that the user wants to adjust the user preview screen 802 at step 710, then at step 712, the controller 300 adjusts the user preview screen 802 according to user input received through the user input unit 302.

At step 714, the controller determines whether the video communication is completed (e.g., whether the user wants to end the video communication). Upon completion of the video communication in step 714, the controller 300 proceeds to end the video communication. Otherwise, the controller 300 proceeds to steps 702 to 712.

As is apparent from the above description of exemplary embodiments of the present invention, when a user takes a self-image using a front camera, the user can naturally monitor the user's own image captured by the front camera. Further, according to exemplary embodiments of the present invention, the user can also monitor the user's own image to be viewed by the other party in a natural and easy manner all the way during video communication.

According to exemplary embodiments of the present invention, the user can easily adjust the position and direction of a device equipped with the front camera so that the user's face is positioned within a display screen.

Furthermore, according to exemplary embodiments of the present invention, participants in video communication can view images in which the other parties are looking straight ahead, making eye contact. Accordingly, the video communication can be conducted, giving a feeling of face to face communication. Therefore, the liveliness of the video communication can be enhanced.

Especially, although it has been described in the exemplary embodiments of the present invention that the other party's face is corrected in the other party's image in step 706 and then the other party's image is shifted in step 708 in the operation of FIG. 7, according to other exemplary embodiments of the present invention, steps 706 and 708 may not be performed if the mobile terminal of the other party also has a front camera 104 on the rear surface of the transparent display 102 like the mobile terminal according to the exemplary embodiments of the present invention. In addition, steps 706 and 708 may also be performed for video communication between general mobile terminals. In this case, although users do not look straight ahead in their images transmitted between them using the general mobile terminals that do not have the front camera 104 on the rear surface of the transparent display 102, the users' images are corrected so that the users appear to be looking straight ahead in the images and the corrected images are then displayed on the displays. Therefore, the liveliness of the video communication is improved. According to exemplary embodiments of the present invention, one of steps 706 and 708 may be omitted at the expense of a more or less decrease in the liveliness of video communication.

Therefore, the scope of the invention should be determined by the appended claims and their legal equivalents, not by the above description, and all changes coming within the meaning and equivalency range of the appended claims are intended to be embraced therein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A video communication apparatus comprising:
a communication unit configured to receive a counterpart image;
a transparent display;
a front camera positioned behind the transparent display, configured to capture an image of an object in front of the transparent display through the transparent display; and
a controller configured to synchronize an image capture period of the front camera with a screen output period of the transparent display so that image capturing of the front camera alternates with screen output of the transparent display, to output, during video communication, an image captured by the front camera to a user preview screen on the transparent display, to transmit the image captured by the front camera to the other party, and upon receipt of the counterpart image of the other party, to output the image of the other party in a preview screen associated with the other party on the transparent display,
wherein the controller shifts the counterpart image of the other party so that the middle of the other party's two eyes in the other party's face in the counterpart image of the other party corresponds to a position of the front camera, and outputs the shifted counterpart image of the other party in the preview screen associated with the other party on the transparent display, and
wherein if the contour of the other party's face is outside the preview screen associated with the other party in the shifted image of the other party, the controller scales down the counterpart image of the other party so that the corresponding scaled-down counterpart image of the other party falls within the preview screen associated with the other party, and outputs the scaled-down counterpart image of the other party in the preview screen associated with the other party on the transparent display.

2. The video communication apparatus of claim 1, wherein the controller edits the counterpart image of the other party so that the other party's pupils are centered in the other party's eyes.

3. The video communication apparatus of claim 1, wherein the user preview screen is displayed centered on a position on the transparent display corresponding to the position of the front camera.

4. A video communication apparatus comprising:
a communication unit configured to receive a counterpart image;
a transparent display;
a front camera positioned behind the transparent display, configured to capture an image of an object in front of the transparent display through the transparent display; and
a controller configured to synchronize an image capture period of the front camera with a screen output period of the transparent display so that image capturing of the front camera alternates with screen output of the transparent display, to output, during video communication, an image captured by the front camera to a user preview screen on the transparent display, to transmit the image captured by the front camera to the other party, and upon receipt of the counterpart image of the other party, to output the image of the other party in a preview screen associated with the other party on the transparent display,
wherein the display of the counterpart image and the captured image is configured such that the user preview screen is overlapped with the preview screen associated with the other party, and when the counterpart image of the other party is displayed in the preview screen associated with the other party, the controller renders at least one of the captured image and the counterpart image to be semi-transparent.

5. A video communication apparatus comprising:
a communication unit configured to receive a counterpart image;
a display; and
a controller configured to, upon receipt of the counterpart image of another party during video communication, shift the counterpart image of the other party so that the middle of the other party's two eyes in the other party's face in the counterpart image of the other party is centered on a screen of the display, and outputting the shifted counterpart image of the other party in a preview screen associated with the other party on the display,
wherein the controller corrects the counterpart image of the other party so that the other party's pupils are centered in the other party's eyes.

6. The video communication apparatus of claim 5, wherein if the contour of the other party's face is outside the preview screen associated with the other party in the shifted image of the other party, the controller scales down the counterpart image of the other party so that the corresponding scaled-down counterpart image of the other party falls within the preview screen associated with the other party and outputs the scaled-down counterpart image of the other party in the preview screen associated with the other party.

7. A method for conducting video communication in an apparatus including a front camera positioned behind a transparent display, for capturing an image of an object in front of the transparent display through the transparent display, the method comprising:
synchronizing, when a video communication mode is set, an image capture period of the front camera with a screen output period of the transparent display so that image capturing of the front camera alternates with screen output of the transparent display;
outputting an image captured by the front camera in a user preview screen on the transparent display;
transmitting the image captured by the front camera to another party of video communication; and
receiving a counterpart image of the other party, and outputting the counterpart image of the other party in a preview screen associated with the other party on the transparent display,
wherein the configuring of the counterpart image of the other party comprises shifting the image of the other party so that the middle of the other party's two eyes in the other party's face in the counterpart image of the other party corresponds to a position on the transparent display corresponding to the position of the front camera, and outputting the shifted counterpart image of the other party in the preview screen associated with the other party, and wherein the configuring of the counterpart image of the other party comprises if the contour of the other party's face is outside the preview screen associated with the other party in the shifted counterpart image of the other party, scaling down the counterpart image of the other party so that the corresponding scaled-down counterpart image of the other party falls within the preview screen associated with the other party, and outputting the scaled-down counterpart image of the other party in the preview screen associated with the other party.

8. The method of claim 7, wherein the configuring of the counterpart image of the other party comprises editing the counterpart image of the other party so that the other party's pupils are centered in the other party's eyes.

9. The method of claim 7, wherein the user preview screen is displayed centered on a position of the transparent display corresponding to the position of the front camera.

10. A method for conducting video communication in an apparatus including a front camera positioned behind a transparent display, for capturing an image of an object in front of the transparent display through the transparent display, the method comprising:

synchronizing, when a video communication mode is set, an image capture period of the front camera with a screen output period of the transparent display so that image capturing of the front camera alternates with screen output of the transparent display;

outputting an image captured by the front camera in a user preview screen on the transparent display;

transmitting the image captured by the front camera to another party of video communication; and receiving a counterpart image of the other party, and outputting the counterpart image of the other party in a preview screen associated with the other party on the transparent display, wherein the configuring of the counterpart image of the other party comprises overlapping the user preview screen with the preview screen associated with the other party, and rendering at least one of the captured image and the counterpart image to be semi-transparent.

11. A method for conducting video communication, comprising:

receiving a counterpart image of another party during video communication;

shifting the received counterpart image of the other party so that the middle of the other party's two eyes in the other party's face in the counterpart image of the other party is centered on a screen of a display;

editing the counterpart image of the other party so that the other party's pupils are centered in the other party's eyes; and outputting the shifted counterpart image of the other party on the screen.

12. The method of claim 11, further comprising, if the contour of the other party's face is outside the screen in the shifted counterpart image of the other party, scaling down the shifted counterpart image of the other party so that a corresponding scaled-down counterpart image of the other party falls within the screen, and outputting the scaled-down counterpart image of the other party on the screen.

\* \* \* \* \*